(12) United States Patent
Rutt et al.

(10) Patent No.: US 6,177,674 B1
(45) Date of Patent: *Jan. 23, 2001

(54) INFRARED RADIATION MODULATING DEVICE

(75) Inventors: Harvey N Rutt, Southampton; Paul A Manning; Paul P Donohue, both of Malvern, all of (GB)

(73) Assignee: The Secretary of State for Defence in Her Britannic Majesty's Government of the United Kingdom of Great Britain and Northern Ireland, Farnborough (GB)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/043,418

(22) PCT Filed: Sep. 9, 1996

(86) PCT No.: PCT/GB96/02221

§ 371 Date: Mar. 19, 1998

§ 102(e) Date: Mar. 19, 1998

(87) PCT Pub. No.: WO97/11402

PCT Pub. Date: Mar. 27, 1997

(30) Foreign Application Priority Data

Sep. 19, 1995 (GB) .................................. 9519078

(51) Int. Cl.[7] ........................................ G01J 5/08
(52) U.S. Cl. ......................... 250/351; 250/343; 250/332
(58) Field of Search .................. 250/332, 338.3, 250/338.4, 343, 349, 350, 351; 359/248, 259, 264, 321

(56) References Cited
U.S. PATENT DOCUMENTS 2,692,950 10/1954 Wallace .
3,688,166 * 8/1972 Desvignes ........................ 359/321
4,594,507 6/1986 Charles et al. .
4,614,957 * 9/1986 Arch et al. ........................ 257/188

FOREIGN PATENT DOCUMENTS 0467581 1/1992 (EP) .

OTHER PUBLICATIONS

Japanese Journal of Applied Physics, Supplements, vol. 40, 1971, Tokyo JP, pp. 186–190, XP002020693 Umeno M et al: "High Efficiency Ge Modulator for Infrared (Laser) Beams" see abstract; sections 1–3.1,5 see figure 1–3.
Physical Review Letters, Jul. 14, 1986, USA, vol. 57, No. 2, ISSN 0031–9007 pp. 249–252, XP000612996 Yablonovich et al: Unusually low surface–recombination velocity on silicon and germanium surfaces see abstract.

* cited by examiner

Primary Examiner—Constantine Hannaher
Assistant Examiner—Albert Gagliardi
(74) Attorney, Agent, or Firm—Nixon & Vanderhye P.C.

(57) ABSTRACT

A non-mechanical modulating device for use in infrared detection. The device is of particular use in the 8–14 μm range and has application in thermal imaging cameras and gas sensing systems. The modulator comprises a germanium element and a means of varying the carrier concentration. In particular, the variation of the hole concentration gives rise to the absorption of infrared radiation due to interband transitions between the light and heavy hole bands in the split valence band in germanium. The variation in hole concentration may be initiated in any convenient way, for example, by the irradiation of the germanium with visible or near infrared light, by the electrical injection of free carriers across a germanium diode structure or by electron impact on the germanium surface following acceleration under vacuum. In the case where the variation in carrier concentration is initiated by optical means, the surface of the germanium is treated so as to produce a low surface recombination velocity.

36 Claims, 8 Drawing Sheets

INFRARED RADIATION MODULATING DEVICE

BACKGROUND OF THE INVENTION

1. Field of the Invention

The present invention relates to a non mechanical modulating device for use in infrared detection and has particular, although not exclusive, use in thermal imaging cameras.

2. Discussion of Prior Art

In such cameras it is desirable to modulate the intensity, that is introduce a time variation of the intensity, of the incident beam of infrared radiation from the image scene, in particular in the 8–14 μm wavelength region. Where the camera uses an array of pyroelectric detectors, the modulation is an essential part of the camera operation. For thermal imaging cameras based on other types of detectors, for example resistive bolometric detectors, capacitive bolometric detectors and ferroelectric detectors, the modulation may not be essential but is a preferred feature. The modulating device may have additional applications in other systems incorporating pyroelectric or other infrared detectors or detector arrays, for example gas sensing or measuring systems where the modulation of infrared radiation from a thermal source is required.

The present technique used to achieve this modulation in both thermal imaging and gas sensing systems makes use of a mechanical chopping device in the form of a rotating disc. Such devices consume substantial power which reduces the battery life when used on portable equipment. In addition, any non-uniformity in the emissivity of the disc can give rise to non-uniformity in the image and which leads to reduced camera performance.

There has been a long felt need for a more convenient, non-mechanical means of modulating the intensity of infrared radiation in thermal imaging cameras. However, the present non-mechanical methods of modulating infrared light in the spectral region of interest have proved to be unsatisfactory. Those based on the electro-optic or acoustic optic effects are bulky, costly and typically only function for one wavelength and one polarization. This is not effective for the wide band of wavelengths and random polarization encountered in a typical infrared image. These techniques normally only function satisfactorily with well collimated beams, in contrast to the low F-number optics used in thermal imaging systems. Attempts to use liquid crystal devices for modulation purposes have also met with very limited success.

Previously, weak modulation effects have been observed in the infrared region by using the injection of free carriers into semiconductor materials such as germanium (Ge) or silicon (Si) [Yamada, *Elec. Lett.* 19 No. 22 (922–944), McQuistan, *J. App. Phys.* 35 No. 4 (1243–1248)]. However, modulating devices for use in thermal imaging cameras have never reached practical operation in the 8–14 μm spectral region. Similarly, devices relying on etalon effects in Si have been described for use in the far infrared but are not suitable for use with thermal imaging cameras as they operate over a narrow band of wavelengths outside the region of interest [H. Alius and G. Dodel, *Infrared Phys. and Technol.*, Vol. 35, No. 1, pp 73–78 (1994), H. Alius and G. Dodel, *Appl. Phys. Lett.*, 57 16 (1990), H. Alius and G. Dodel, *Infrared Physics*, 32 pp 1–11 (1981)].

Stronger modulation effects have been observed in the infrared region by using the injection of free carriers into germanium and utilising interband transitions between the split valence bands in germanium [Umeno et al, "High-Efficiency Ge Modulator for Infrared (Laser) Beams" *Japanese Journal of Applied Physics, Supplements*, vol. 40, 1971, Tokyo]. However, the device proposed provides fast modulation (typically 10–20 kHz) unsuitable for use with infrared imaging systems. For example, pyroelectric detector arrays typically operate with readout frequencies of between 50–150 Hz (i.e. around an order of magnitude slower). Furthermore, the device cannot provide the uniformity of modulation depth required for a modulator device for an imaging system.

SUMMARY OF THE INVENTION

The present invention relates to a non-mechanical modulating device for use in infrared detection and operates successfully in the 8–14 μm spectral region. It has particular use in thermal imaging cameras where it offers a convenient alternative to the know mechanical infrared modulators used in existing cameras, in particular those comprising an array of pyroelectric detectors. A significant advantage of the device is its insensitivity to shock and vibration compared to the mechanical choppers used in existing systems. The present device is also has the ability to operate reliably after long storage. The device may also be used in gas sensing or measuring systems where it is preferable, and in some cases essential, to modulate an infrared radiation source prior to detection.

In this specification, the use of the word "detector" should be taken to relate to the detector or array of detectors of which the infrared detection system is comprised.

According to the present invention, a device for modulating radiation input to an infrared detector comprises;

an element of germanium, having a region doped with acceptor atoms and a region doped with donor atoms wherein the element of germanium has facing input and output surfaces and a valence band comprising light hole and heavy hole sub-bands and means for electrically injecting carriers into the germanium so as to vary the carrier concentration across the germanium, whereby the variation in carrier concentration gives rise to modulation of the intensity of infrared radiation transmitted through said germanium element, wherein said modulation is substantially due to carrier transitions between the light hole and heavy hole sub-bands, characterised by a central region (23) between the region (20) doped with acceptor atoms and the region (21) doped with donor atoms, wherein the central region (23) has a carrier concentration sufficient to substantially prevent absorption of infrared radiation (8) in the absence of electrically injected carriers.

The infrared detector may be part of a thermal imaging camera or a gas sensing system.

The region doped with acceptor atoms may be any one of a p-type region or a p$^+$-type region, and the region doped with donor atoms may be any one of an n-type region or an n$^+$-type region. The central region may be an intrinsic region or a weakly doped n-type region. For example, the germanium may have a structure of any one of the form p-i-n, p-υ-n, p$^+$-i-n, p$^+$-υ-n, p$^+$-i-n$^+$, p$^+$-υ-n$^+$.

The germanium may be divided into areas which can be individually energised and which may be spatially separated from each other. Preferably, the input surface of the element of germanium has an effective diameter of at least 0.5 mm and, more preferably, an effective diameter of at least 1.0 mm. The germanium element may be a single crystal and, preferably, may have a long minority carrier lifetime.

The means for electrically injecting carriers may be spatially non-uniform so as to enable the spatial modulation of the incident infrared radiation.

The surface of the germanium element may be treated so as to reduce the surface recombination velocity. The surface treatment may include any one of chemical etching, electrochemical etching, reactive ion etching, plasma etching or ion beam milling. Furthermore, the surface of the germanium element may be polished.

The germanium element may have an anti reflection coating applied to one or more of its surfaces, for example this may be a multiple layer coating.

Alternatively, a layer of semiconductor material having a wider bandgap than germanium, grown epitaxially on one or more surfaces of the germanium element. For example, the semiconductor material may be any one of gallium phosphide, gallium arsenide, gallium-arsenide-phosphide alloys or silicon-germanium-alloys. An anti reflection coating, for example a multiple layer coating, may then be applied to one or more surfaces of the semiconductor material.

BRIEF DESCRIPTION OF THE DRAWINGS

The invention will now be described, by example only, with reference to the following figures in which.

DETAILED DISCUSSION OF PREFERRED EMBODIMENTS

Figure 1:
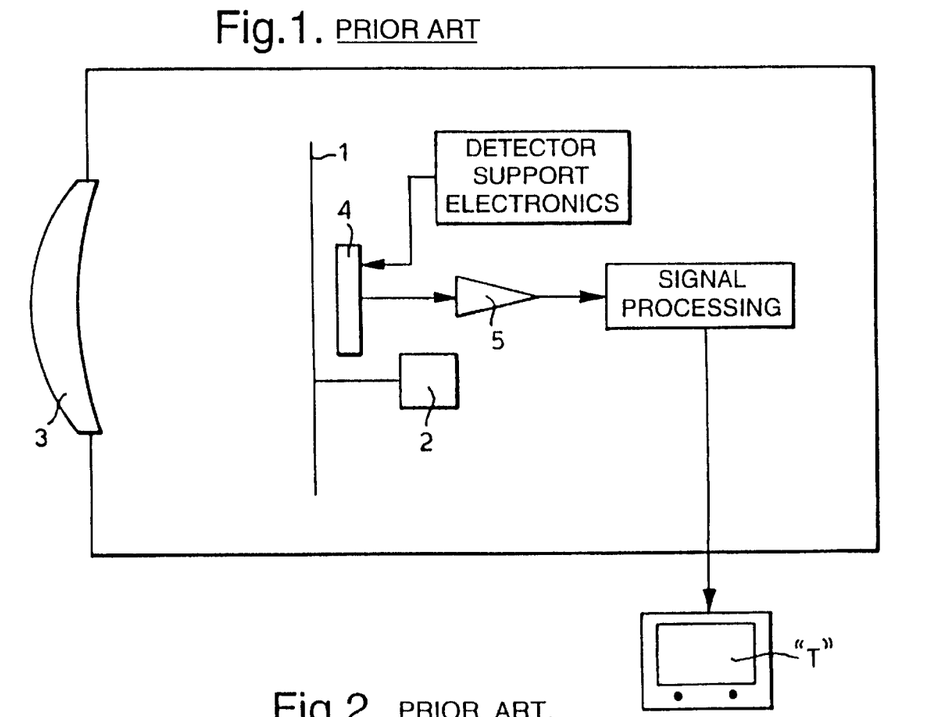
FIG. 1 shows a schematic diagram of a pyroelectric imaging camera, known in the prior art, incorporating a mechanical chopper disk as a modulating device.

Referring to FIG. 1, a typical pyroelectric imaging camera known in the prior art comprises a chopper 1, a chopper motor 2, an input lens 3 and a detector 4 and the associated detector amplifier 5. The subsequent signal processing path, detector support electronics and T.V. monitor ("T") are also shown in the figure. This camera design is well known in the prior art. The chopper 1 is mounted in between the input lens 3 and the detector (or detector array) 4 and is driven by means of a chopper motor 2.

Figure 2:
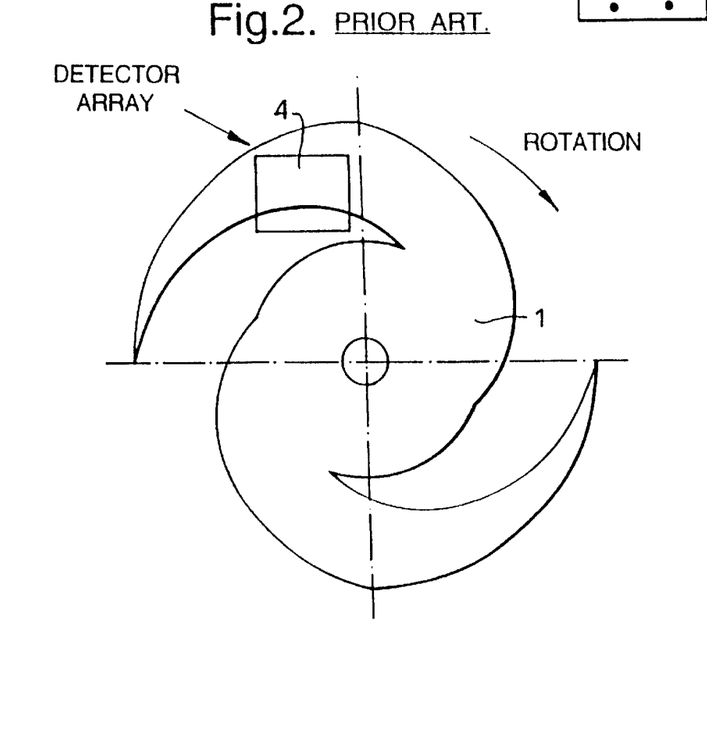
FIG. 2 shows a diagram of a typical mechanical chopper disc known in the prior art, for use in a thermal imaging camera.

Referring to FIG. 2, the mechanical chopper 1 rotates about a fixed axis and the system is designed so that the chopper 1 "sweeps across" the face of the detector 4, modulating, in turn, the intensity of infrared radiation from the image scene entering each individual element of the detector 4. Mechanical chopping devices of this design are well known in the prior art.

Figure 3:
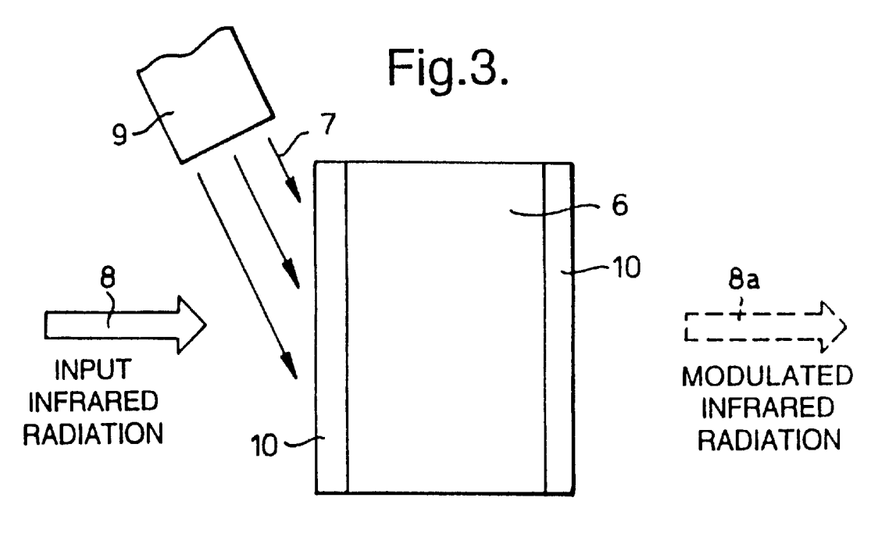
FIG. 3 shows a schematic diagram of the present invention where the variation in carrier concentration is initiated by means of visible or near infrared radiation incident on the surface of the germanium.

FIG. 3 refers to the present invention. The modulating device is comprised of germanium element 6, preferably a single crystal, and may be situated in front of the detector 4 (as shown in FIG. 1) in a thermal imaging camera. By varying the concentration of free carriers in the germanium 6, in particular the hole concentration, strong absorption effects are induced in the 8–14 $\mu$m wavelength region. To improve the transmission of the thermal image infrared radiation, one or more surfaces of the germanium element may be coated with an anti reflection coating 10.

Figure 4:
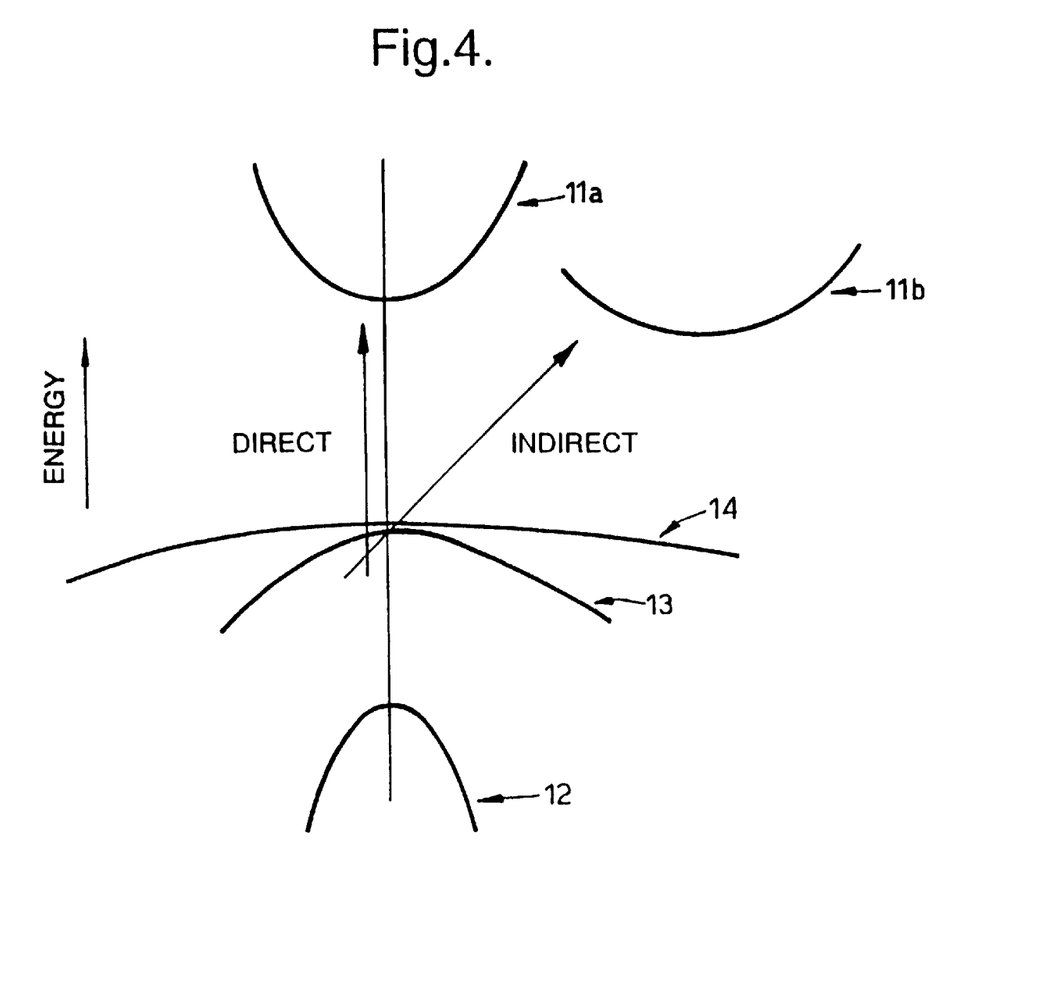
FIG. 4 shows a schematic diagram of the band structure in germanium.

FIG. 4 shows the overall band structure in germanium, where 11a and 11b indicate conduction bands and 12, 13 and 14 indicate the spin orbit split off band, the light hole band and the heavy hole band respectively in the split valence band. The strong absorption effects in the 8–14 $\mu$m wavelength region are induced by interband transitions between the light and heavy hole bands 13, 14 in the split valence band.

The required variation in the hole concentration may be produced in a number of ways, for example, optically, electrically or by electron impact from a vacuum region. In the present example (FIG. 3), the variation of free carrier concentration is initiated by means of visible or near infrared radiation 7, with a wavelength of less than 1.9 $\mu$m, incident on the surface of the germanium element 6. This generates electron-hole pairs in the germanium 6, the holes providing the majority of the required absorption of transmitted infrared radiation 8. In addition, the variation of the electron density in the germanium also produces a small absorption. The transmitted radiation 8 is therefore modulated on passing through the germanium 6.

The light may be from any convenient source 9, but a semiconductor or light emitting diode coupled to the modulator by conventional or fibre optics is most suitable. The visible or near infrared radiation may be spatially non uniform so as to spatially modulate the transmission through the germanium, and may be modulated in time to provide the modulation function. The wavelength of the incident radiation 7 is ideally chosen so that it is fully absorbed in the germanium. However, the device is less sensitive to unwanted surface recombination effects if the longest wavelength consistent with absorption at the temperature of operation is chosen.

If the germanium is excited by optical means and relatively short wavelength radiation is used, electrons in the split valence band are excited by a direct transition into the conduction band 11a. The electrons then relax down into band 11b which has a relatively long lifetime. If longer wavelength radiation is used to excite the germanium, electrons are excited by an indirect transition into the conduction band 11b.

Longer wavelength radiation penetrates deeper into the germanium and therefore in this case the germanium is less sensitive to the surface recombination velocity. The effect is particularly strong for indirect excitation. Since the reducing effect of surface recombination velocity and the increased number of photons per watt increase the performance of the device indirect excitation is beneficial. However, currently laser diodes suitable for this purpose are expensive and direct excitation with cheaper diodes may be preferable. Direct excitation occurs for incident pumped radiation having a wavelength of less than approximately 1.55 $\mu$m, whereas indirect excitation occurs for incident radiation having wavelengths between approximately 1.55 $\mu$m and 1.9 $\mu$m, although these wavelengths are temperature sensitive.

The device may operate up to approximately 100° C., a limit set by the increasing absorption in the germanium caused by thermally generated carriers, but operation at or below room temperature is preferable. Preferably, the geometry of the arrangement is such that any visible or near infrared radiation 7 from the source 9 does not enter the detector 4. As an additional measure, the detector 4 may also be provided with a filter to reflect or absorb any such radiation.

Typically, the input face of the modulating device presents an effective aperture of greater than 0.5 mm to the incoming infrared radiation. The preferred size of the effective aperture may be determined by the dimensions of the detector used in conjunction with the device 4, or the particular function of the detection system in which the device is used. For example, when mounted in front of a large infrared detector array, the effective diameter of the input face of the device will preferably be large enough to modulate the input to each individual array element, typically greater than 1 mm. In some circumstances, it may be necessary to tilt one or more surfaces of the device at some angle to the incoming radiation, for example to suppress stray reflections.

In the implementation of the device shown in FIG. 3, where the variation in carrier concentration is generated by optical means, the surfaces of the germanium must be treated in such a way as to produce a low surface recombination velocity, so that carriers do not rapidly recombine at the surface. For example, methods that may be used for the preparation of a suitable surface or surfaces are controlled chemical etching, reactive ion etching, plasma etching, ion beam milling or careful polishing.

Several germanium samples have been tested for use in the device and a range of different chemical etchings and etching conditions have been employed to give the required surface properties. Examples of the chemical etchants which have been used are:

(A) CP4 ($HNO_3$/HF/$CH_3COOH$/$Br_2$)

(B) CP6 (as CP4 but without bromine)

(C) Concentrated hydrogen peroxide ($H_2O_2$)

(D) HF—$H_2O2$—$H_2O$ and (E) SbOCl electrolytic etch.

The etch rate and the etched surface morphology are a function of the etchant, the etching conditions, the polishing history and possibly the material details. The following details are examples of the etching procedures that may be employed to give the required surface properties and should not be taken as limiting. Alternative etch times and conditions using these and other etchants may also be employed. In all cases, the surface of the germanium was also pre-polished, the extent of the polishing depending on the initial state of the germanium surface.

For etchants A and B, the germanium is placed in the solution for approximately 1 minute, and then removed and rinsed with methyl alcohol. For etchant C, the germanium is placed in $H_2O_2$ and boiled for 3 minutes. The sample is then removed and rinsed with first methyl alcohol and then distilled water. For etchant D, the germanium is placed in the etchant for approximately 4 minutes, whilst stirring. The etchant is then diluted with water and poured off the germanium sample. For etchant E, the germanium is immersed in the etchant and electrolyzed approximately 5 minutes, with a potential of ±1.5V on the germanium. The germanium is then removed and rinsed with methyl alcohol and dried in an airstream.

A polishing treatment may also be applied to the surface of the germanium element in such a way as to minimise the sub-surface damage to the crystalline structure and so to reduce the surface recombination velocity. For example, this may be a chemical polishing technique or a chemo-mechanical polishing technique, the details of which would be standard to one skilled in the art. A careful polishing process may be sufficient to produce the required surface properties, depending on the original condition of the germanium sample.

As mentioned previously, a pre-polishing treatment may be applied to the sample prior to chemical etching. The extent of the chemical etching required to produce the desired surface properties depends on the extent of the pre-polishing.

The techniques of reactive ion etching, plasma etching or ion beam milling may be applied to the surface of the germanium to produce or maintain the desired surface properties. Plasma etching is a dry chemical etching technique in which reactive gases like $CF_4$ and $CCl_4$, which contain halogen atoms, are used. Reactive ion etching occurs partly by a chemical reaction and partly by the removal of the unwanted material by ion bombardment. The techniques of reactive ion etching and plasma etching would be standard to one skilled in the art.

A combination of two surface treatments may be also used to produce or maintain the desired surface properties of the germanium. For example, a reactive ion etch or ion beam mill may be followed by a chemical etching process. Whilst the processes of reactive ion etching and ion beam milling can result in an extremely flat surface, there may be a very shallow (a few atoms) damaged layer remaining on the surface which a brief etching process is capable of removing.

Figure 5:
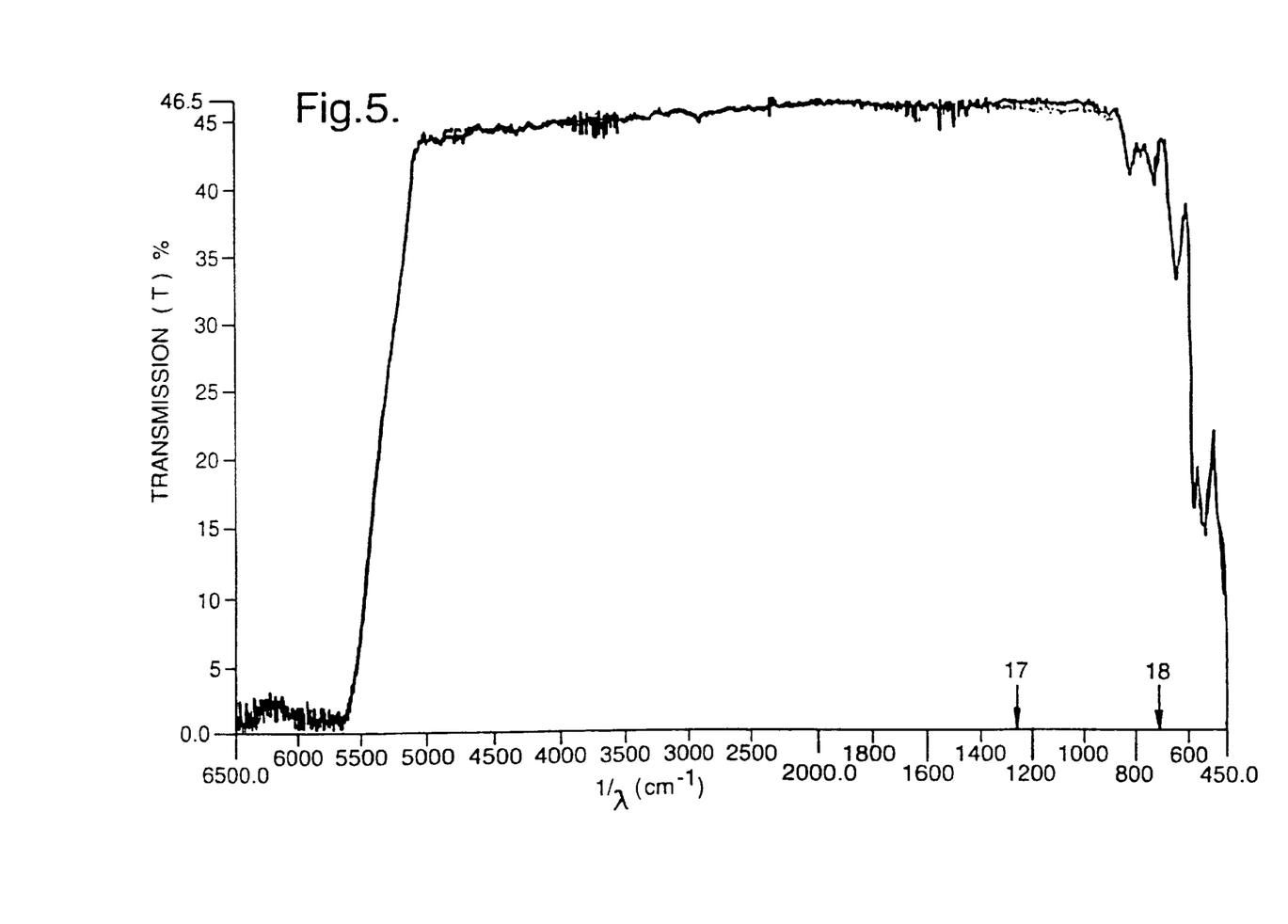
FIG. 5 shows the transmission of a typical germanium element as a function of the wavelength of incident infrared radiation, where the surface has not been treated in such a way as to reduce the surface recombination velocity.
Figure 6:
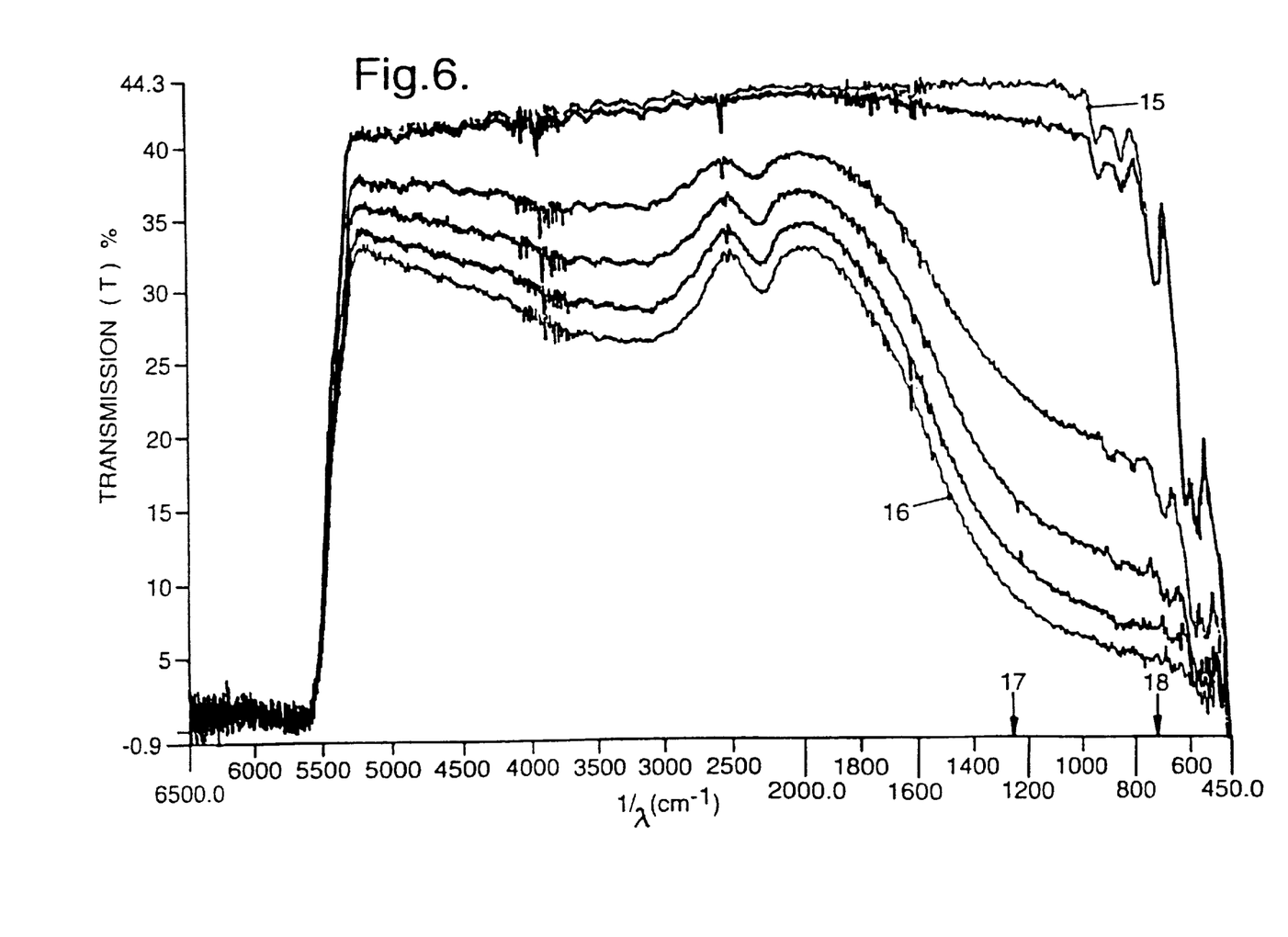
FIG. 6 shows the transmission of the germanium element of FIG. 4, where the surface has been treated in such a way as to reduce the surface recombination velocity.

As an example, FIGS. 5 and 6 show the transmission (T%) of a sample of germanium (not anti reflection coated) as a function of the reciprocal wavelength ($1/\pi$) of radiation incident on the sample. FIG. 5 shows the transmission characteristics of the germanium sample before the input surface has been treated to reduce the surface recombination velocity, and FIG. 6 shows the characteristics of the same germanium sample after the input surface has been treated to reduce the surface recombination velocity. In both cases the germanium sample was irradiated with a 808 nm radiation from a laser source.

Referring to FIG. 5, the laser radiation was of zero and maximum power density, with the dashed line (only visible between approximately 7 and 11 $\mu$m) indicating the transmission characteristics for the maximum power density. The spectral region of particular interest, between 8 $\mu$m and 14 $\mu$m, is indicated by the numbers 17 and 18 respectively. Throughout this region, the transmission of incident infrared radiation remains constantly high (approximately 46%).

As a comparison (see FIG. 6), when the germanium surface has been chemically etched so as to reduce the surface recombination velocity, the transmission is considerably reduced in the 8–14 $\mu$m region. The different curves of FIG. 6 correspond to the increasing power densities of the 808 nm laser source, where the zero and maximum power density curves are 15 and 16 respectively.

The germanium samples tested varied in dimension, but were typically a fraction of a millimeter to a few millimeters, for example, several samples were of 25 mm diameter and 3 mm in thickness. The carrier diffusion length, L, is defined by the following relationship;

$$L=(D\tau)^{1/2}$$

where D is the carrier diffusion coefficient and $\tau$ is the carrier lifetime. If the thickness of the germanium is less than a few times the carrier diffusion length, then both surfaces should have a low surface recombination velocity. If the germanium is several times the carrier diffusion length, then the surface to be illuminated should have a low surface recombination velocity, but the unilluminated surface may have a high surface recombination velocity without reducing the device performance.

The quality of the germanium sample used in the device is particularly important; germanium of a grade produced for nuclear radiation detection is particularly suitable. The important feature is that in order to obtain a long minority carrier lifetime the germanium sample must be substantially free from impurities, such as copper or crystallographic defects, which introduce states into the middle of the germanium bandgap and cause recombination and reduce the minority carrier lifetime. Less pure germanium may also be used. This would be first heated in a low pressure hydrogen discharge so as to diffuse the hydrogen into the material, therefore passivating the impurity sites. The process of "gettering" impurities from the germanium sample may also be used to enable less pure samples to be used in the device. This includes, for example, sputtering or evaporating on a layer of gold into the germanium, heat treating the sample so as to concentrate other impurities into the gold containing layer and etching or polishing off this layer to remove the gold and concentrated impurities.

To improve the transmission of the thermal image infrared radiation, one or both surfaces are anti reflection coated, as mentioned previously. The results shown in FIGS. 5 and 6 correspond to germanium samples which have not been anti reflection coated. The anti reflection coating 10 is arranged to be compatible with the required surface properties, in particular the low surface recombination velocity. For example, Zinc Sulphide (ZnS) is a typical anti reflection coating. Alternatively, the anti reflection coating may take the form of a multiple layer coating. A typical multiple layer coating may comprise of a first layer of material with refractive index 3.3, with an optical thickness one quarter of a wavelength, $\lambda$, (where $\lambda$ is, typically, the wavelength of infrared radiation incident on the device) next to the germanium surface, a second layer of material with a refractive index of 2.2 and a third layer of material with a refractive index of 1.35. As an additional example, a 4 layer coating may comprise of a first layer of material with refractive index 2.96, with an optical thickness one quarter of a wavelength, $\lambda$, next to the germanium surface, a second layer of material with a refractive index of 2.2, a third layer of material with a refractive index of 1.82 and a fourth layer of material with a refractive index of 1.38. The construction of such multiple layer anti reflection coatings would be conventional to one skilled in the art.

Referring to FIG. 3, where the electron-hole pairs are generated optically, the anti reflection coating 10 may be designed in such a way that in addition to improving the transmission of the thermal image infrared radiation, the input face also acts as an anti reflection coating for the visible or near infrared radiation 7 which produces the electron-hole pairs. For example, a layer of ZnS with an optical thickness of one quarter of a wavelength at 10 $\mu$m in the thermal image band (corresponding to a physical thickness of approximately 1.13 $\mu$m) will form a good simple anti reflection coating in a band around 10 $\mu$m. This layer will also serve as an anti reflection coating at approximately 10/n $\mu$m, where n is an odd number. For example, it will anti reflect at approximately 1.67 $\mu$m, 1.43 $\mu$m and 1.25 $\mu$m etc., which are suitable wavelengths for the near infrared radiation 7.

Figure 7:
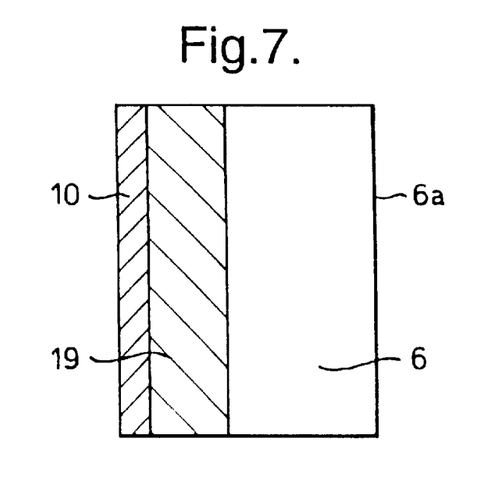
FIG. 7 shows a schematic diagram of a germanium sample coated with an additional semiconductor material and an anti reflection coating.

Referring to FIG. 7, a layer of semiconductor material 19, with a wider bandgap than germanium, may be applied epitaxially to the germanium element 6 so as to repel carriers from the surface and therefore reduce the effective surface recombination velocity. In addition, the surface of the semiconductor layer 19 may be coated with an anti reflection coating 10, as described previously, in order to improve the transmission of the device.

The epitaxial layer of semiconductor material 19 may be applied to one or more surfaces of the germanium element 6, depending on the thickness of the particular element. For example, if the germanium element is thin (i.e. the thickness is less than a few times the carrier diffusion length), the semiconductor material 19 should be applied to both the input surface (that is the surface upon which the infrared radiation 8 is incident) and the output surface 6a of the germanium element 6. If the germanium element 6 is thick (i.e. more than a few times the carrier diffusion length) it is only necessary to apply the semiconductor material 19 to the input surface.

Another possible arrangement would be to have a semiconductor material 19 and anti reflection coating 10 on one face (as shown in FIG. 7) and an additional anti reflection coating on the opposite face 6a. Examples of such semiconductor materials would be gallium phosphide, gallium arsenide, gallium arsenide phosphide alloys and silicon germanium alloys. Such layers may be produced using molecular-beam-epitaxy (MBE), metal-organic-chemical-vapour-deposition (MOCVD) and other techniques well known to those skilled in the art. Additionally, a silicon germanium layer may be produced by ion implantation of silicon into the germanium followed by annealing.

Figure 8:
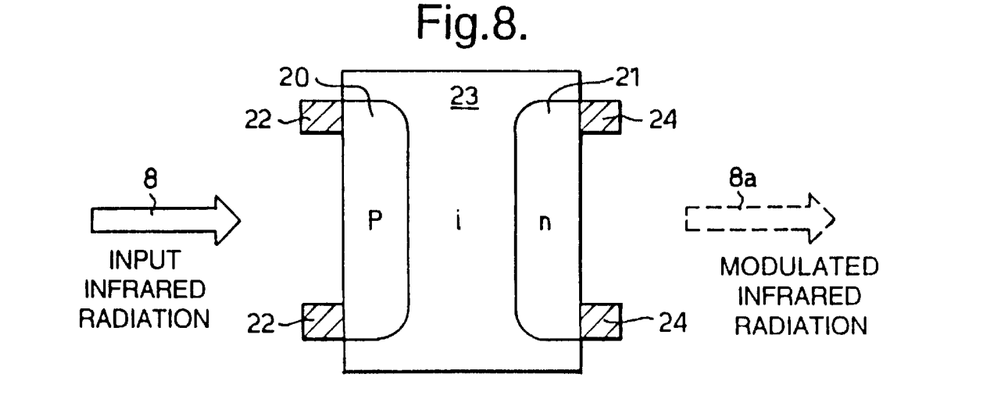
FIGS. 8, 9 and 10 show different implementations of the device, where the variation in carrier density is provided by carrier injection using a germanium diode structure of the form p-i-n

Referring to FIG. 8, the variation in hole density is provided by carrier injection using, for example, a p-i-n diode structure. The device comprises of an intrinsic germanium element 6 with p- and n-type germanium either side (20 and 21 respectively). The intrinsic region may be $\upsilon$- or $\pi$-type (weakly n-type or weakly p-type respectively) although using a $\upsilon$-type region may be more advantageous. The surface or surfaces of the device may be prepared in such a way as to produce or maintain a low surface recombination velocity, as described previously, although this is not essential for this implementation of the device. Appropriate anti reflection coatings may be applied to the surface of the germanium to improve the transmission of the device.

To forward bias the diode, a positive voltage is applied to a contacts 22 on the p-type layer 16, therefore injecting holes from the p-type layer 20 into the intrinsic region 23. The negative contacts 24 are on the n-type layer 21. When the diode is not forward biased, it is in its transmitting state (i.e. infrared radiation passes through the device to the detector) and few carriers are present in the intrinsic region 23. Under forward bias, large numbers of holes are injected into the intrinsic region 23 and transmitted infrared radiation 8 is absorbed. The p-type layer 20 is kept as thin as possible consistent with obtaining a sufficiently uniform injected current so as to reduce absorption of transmitted infrared radiation 8. The thickness of the n-type layer 21 is less critical as free electrons are less absorbing than free holes.

Figure 9:
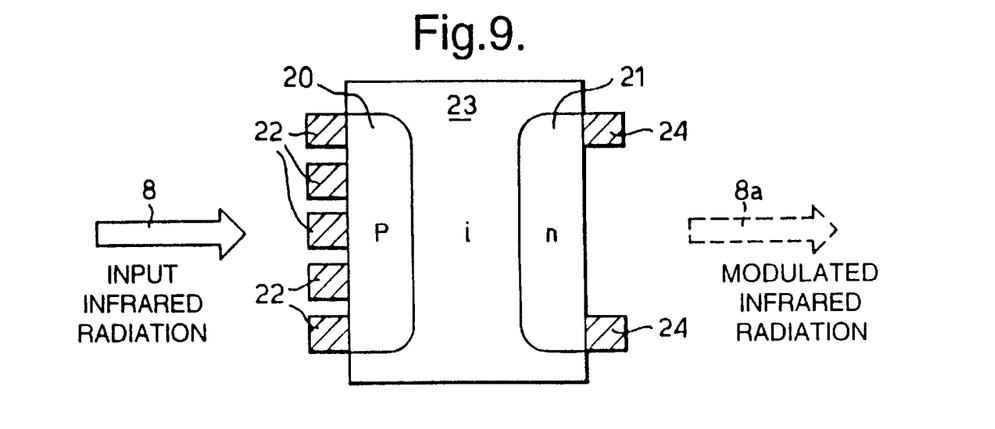

Referring to FIG. 9, the p-i-n diode structure may have an array of metal grid elements 25 deposited onto the p-type layer 20. The metal grid may be used to improve the uniformity of the injected current. If it is desired to vary the transmission spatially, only certain elements of the grid need be forward biased at any one time, giving rise to a reduced transmission only in selected regions. This may also be achieved by manufacturing regions of $p^+$ semiconductor 26 (heavily doped p-type germanium) into the p-type region 20 (see FIG. 10). Identical methods may also be applied to the n-type layer 21.

The variation in the hole concentration may be produced by the electrical injection of carriers across a p-n, p-i-n', p-$\upsilon$-n, p-$\pi$-n, $p^+$-n-$n^+$ or p-n-$n^+$ junction, where i indicates an intrinsic region, $\upsilon$ indicates a very slightly n-type region, $\pi$ indicates a very slightly p-type region, $p^+$ indicates a heavily doped p-type region and $n^+$ indicates a heavily doped n-type region. For junctions of the form p-x-n (where x=i, n or p) region 23 is preferably either i or $\upsilon$, as the device performance is reduced if it is $\pi$-type due to the absorbing effects of the slight hole concentration.

Figure 10:
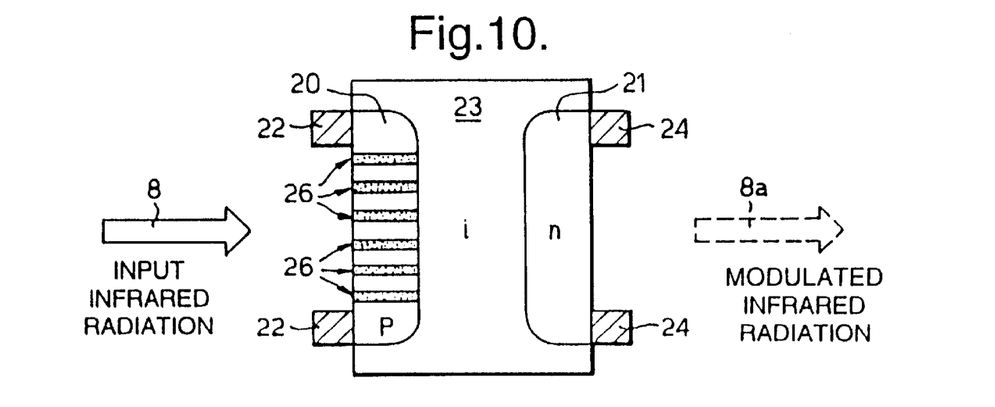

Referring to FIGS. 8, 9 and 10, the device may be operated in reverse mode, such that the input infrared radiation 8a and the modulated infrared radiation 8b may be interchanged. In this alternative arrangement, the input radiation 8 traverses a n-i-p junction rather than a p-i-n junction.

Figure 11:
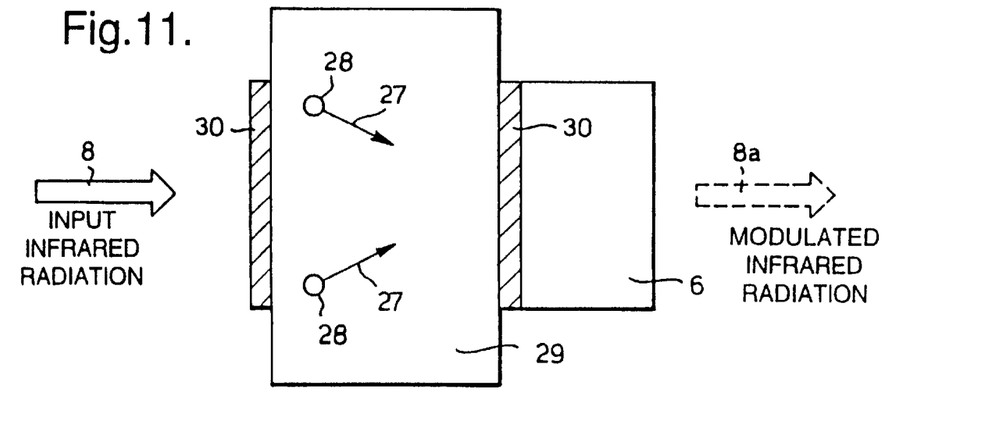
FIGS. 11, 12 and 13 show different implementations of the device, where the variation in carrier density is initiated by the acceleration of electrons across a vacuum region and their impact with the germanium surface.

Referring to FIG. 11, the cathode 28 is a thermionic cathode or a photocathode, illuminated by an external source (not shown). The surface or surfaces of the germanium 6 are prepared so as to produce or maintain a low surface recombination velocity, as described previously. By coating the window of the vacuum region 29 with a suitable anti reflection coating 30, the transmission of the device is enhanced.

In this example, electron-hole pairs are produced in the germanium 6 by allowing electrons 23 from a cathode 28 to be accelerated across a vacuum region 29 before impact with the germanium element 6. The cathode 28 may be of any convenient form, but a non-thermal emission cathode such as a photocathode or field emission cathode is preferable to avoid infrared generated by a hot cathode entering the detector.

Figure 12:
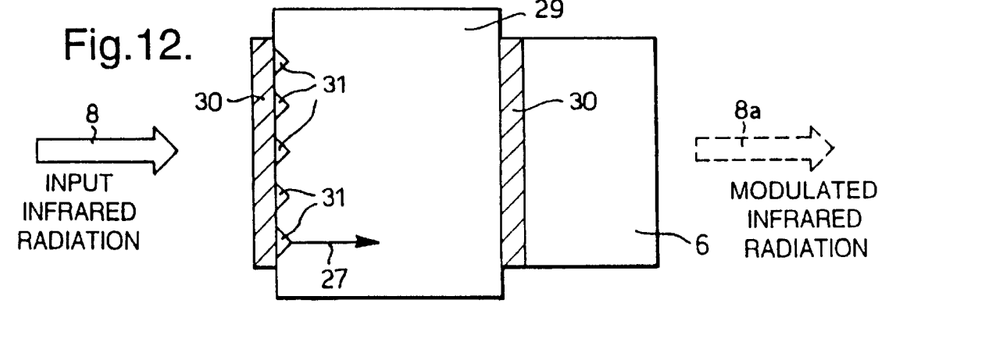

FIG. 12 is a modification of the implementation shown in FIG. 11, with like parts indicated by like numbers. In this implementation, the cathode is an infrared transparent cathode with an array of micro-machined sharp points 31 acting as field emitters.

Figure 13:
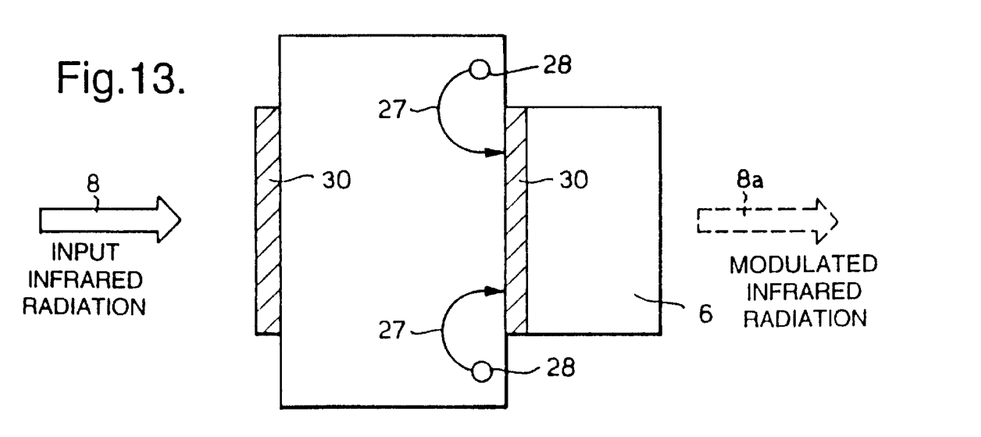

FIG. 13 is a modification of the implementation shown in FIG. 11, with like parts indicated by like numbers. In this implementation, the cathode 28 are thermal emission cathodes and are placed so that infrared emission does not enter the detector. Magnetic or electric fields (not shown) may be employed to control the path of the electrons 27.

In these examples (FIGS. 11, 12 and 13), spatial modulation may be obtained with the aid of magnetic deflection coils (not shown), auxiliary electrostatic deflection or gating electrodes, or by dividing the cathode into a number of separate electrodes which may be individually energised.

Although FIGS. 11, 12 and 13 illustrate the preferred arrangement of the device components for these implementations, it would also be possible to operate the device in reverse the arrangement whereby the input infrared radiation 8 and the output infrared radiation 8a are interchanged.

Figure 14:
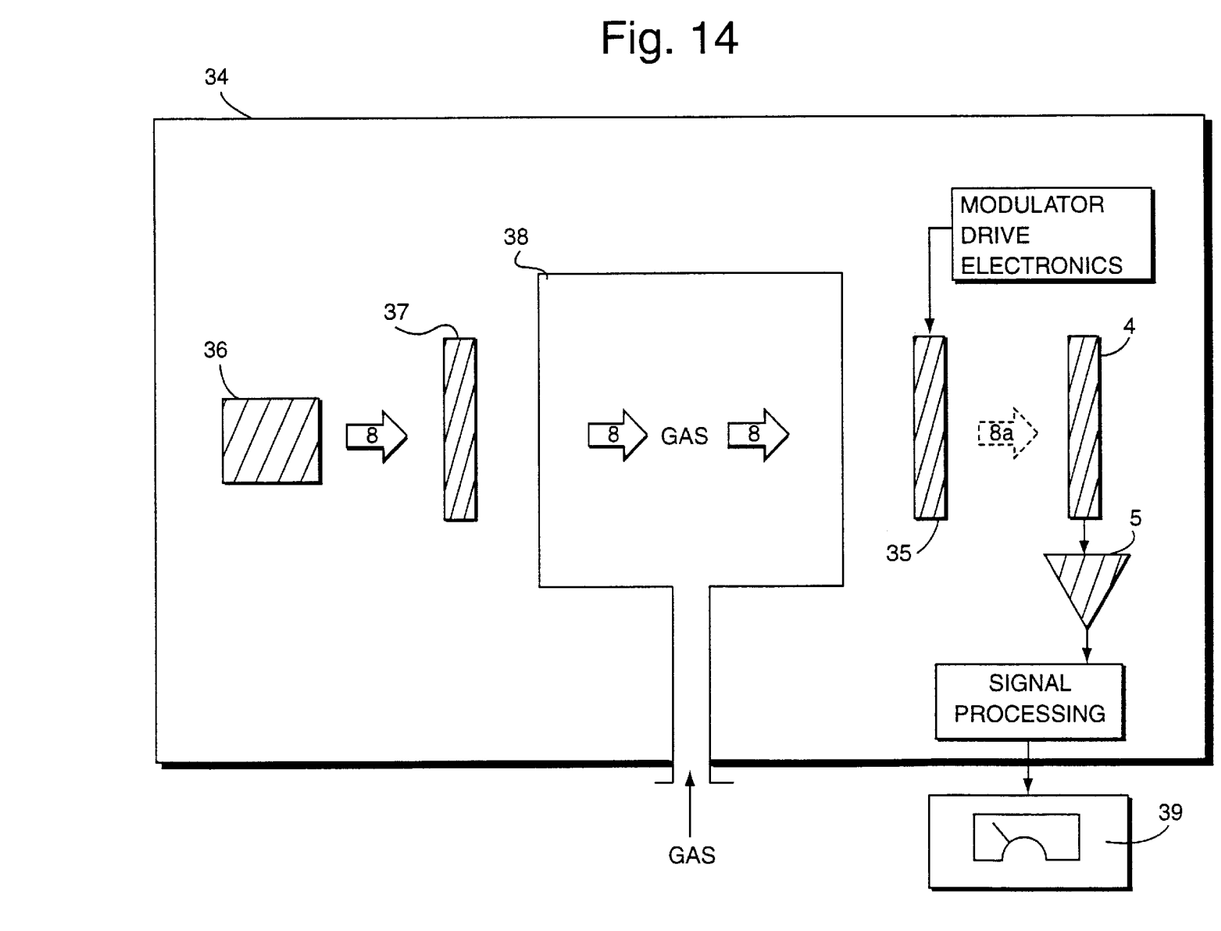
FIG. 14 shows a schematic diagram of a gas sensing system including the present invention.

Although the device has particular use in thermal imaging cameras, it may be used to modulate the intensity of input radiation to any infrared detection system, for example, security cameras based on the detection of infrared radiation. The device may also be used in an infrared gas sensing or measuring system 34 as shown in FIG. 14, the operation of which is well known to those skilled in the art. Such systems typically comprise a source of infrared radiation 36, means for filtering the source of infrared radiation so as to restrict the incoming infrared wavelengths to a particular wavelength region 37 an infrared detector 4 and indication 39. In many cases two input channels are used, one of which interacts with the target gas under test and one which does not, so that variations in the source intensity can be eliminated and the effects of interference from other gases may be reduced.

In such systems it is preferable to modulate the infrared radiation input to the detector. In cases where pyroelectric detector systems are used, this modulation is essential. In cases where other types of infrared detectors are used, it is preferable to improve the system's signal-to-noise frequently via the well know process of phase sensitive detection. A convenient form of infrared source is simply a small hot object run at a temperature appropriate to the infrared wavelength desired. However, since the temperature cannot be modulated rapidly, this necessitates the use of a mechanical shutter or chopper identical or similar to that described previously for use in thermal imaging systems (as shown in FIG. 2). The modulator typically takes the form of a toothed wheel having alternating transmitting and opaque sectors.

The infrared modulating device 35, having the form of the device described for use in thermal imaging systems, may therefore be used as a non-mechanical modulator in gas sensing or measuring systems. The device may be used to modulate the beam of infrared radiation passing from the infrared source 36 through the gas sample 38 under test (or a reference sample) to the infrared detector 4 and may be placed not just in front of the infrared detector, but at any convenient point in the optical chain as shown in FIG. 14. Typically, the effective aperture of the device used in a gas sensing system may be smaller than for thermal imaging applications. For example the effective aperture may be greater than or equal to 0.5 mm.

What is claimed is:

1. A device for modulating infrared radiation at a frequency of less than 150 Hz in the spectral range 8–14 $\mu$m input to an infrared detector, said modulating device comprising:

an element of germanium, having a region doped with acceptor atoms and a region doped with donor atoms, said regions being separated by a central region, wherein the element of germanium has facing input and output surfaces and a valence band comprising light hole and heavy hole sub-bands and exhibits a modulation frequency less than 150 Hz, means for varying the carrier concentration in said germanium, whereby the variation in carrier concentration gives rise to modulation of the intensity of infrared radiation transmitted through said germanium element, wherein said modulation is substantially due to carrier transitions between the light hole and heavy hole sub-bands, wherein the central region has a carrier concentration sufficient to substantially prevent absorption of infrared radiation in the absence of electrically injected carriers.

2. A thermal imaging camera comprising an infrared detector and the device for modulating infrared radiation to said infrared detector according to claim 1.

3. A gas sensing system including a source of infrared radiation, an infrared detector and the device for modulating infrared radiation to said infrared detector according to claim 1.

4. The device of claim 1 wherein the central region is an intrinsic region.

5. The device of claim 1 wherein the central region is a υ-type region.

6. The device of claim 1 wherein the region doped with acceptor atoms is any one of a p-type region or a $p^+$-type region.

7. The device of claim 1 wherein the region doped with donor atoms is any one of an n-type region or an $n^+$-type region.

8. The device of claim 1 wherein the germanium has a structure of any one of the form p-i-n, p-υ-n, $p^+$-i-n, $p^+$-υ-n, $p^+$-i-$n^+$, $p^+$-υ-$n^+$.

9. The device of claim 1 wherein the germanium is divided into areas which can be individually energised and which may be spatially separated from each other.

10. The device of claim 1 wherein the input surface of the element of germanium has an effective diameter of at least 0.5 mm.

11. The device of claim 1 wherein the input surface of the element of germanium has an effective diameter of at least 1.0 mm.

12. The device of claim 1 wherein the germanium element is a single crystal.

13. The device of claim 1 wherein the means for varying is spatially non-uniform so as to enable the spatial modulation of the incident infrared radiation.

14. The device of claim 1 wherein at least one of the surfaces of the germanium element is treated so as to reduce the surface recombination velocity.

15. The device of claim 14 wherein the surface treatment includes any one of chemical etching, electrochemical etching, reactive ion etching, plasma etching or ion beam milling.

16. The device of claim 15 wherein the surface of the germanium element is polished.

17. The device of claim 1, and further comprising an anti reflection coating applied to one or more surfaces of the germanium element.

18. The device of claim 17, wherein the anti reflection coating is a multiple layer coating.

19. The device of claim 1 and further comprising a layer of semiconductor material having a wider bandgap than germanium, grown epitaxially on one or more surfaces of the germanium element.

20. The device of claim 19 where the semiconductor material is one of gallium phosphide, gallium arsenide, gallium-arsenide-phosphide alloys or silicon-germanium-alloys.

21. The device of claim 20, and further comprising an anti reflection coating applied to one or more surfaces of the semiconductor material.

22. The device of claim 21 wherein the anti reflection coating applied to one or more surfaces of the semiconductor material is a multiple layer coating.

23. The device of claim 1, wherein infrared radiation incident on said device is variable in the range of 10%–40% for radiation in the spectral range 8–14 $\mu$m.

24. The device of claim 1, wherein the means for varying carrier concentration in the germanium element is variable radiation incident on the element.

25. The device according to claim 1, wherein the means for varying carrier concentration in the germanium element is variable electrons impacting said germanium element.

26. The device of claim 1, wherein the central region and the region doped with donor atoms are both n-type regions.

27. The device of claim 1, wherein the germanium element is substantially free from impurities.

28. The device of claim 1, wherein the modulation frequency is in the range of 50–150 Hz.

29. A device for modulating infrared at a frequency of less than 150 Hz radiation in the spectral range 8–14 $\mu$m input to an infrared detector comprising:

an element of germanium, having a region doped with acceptor atoms and a region doped with donor atoms, said regions being separated by a central region, wherein the element of germanium has facing input and output surfaces and a valence band comprising light hole and heavy hole sub-bands and exhibits a modulation frequency less than 150 Hz, a variable source of light incident on said germanium thereby varying the carrier concentration in said germanium, whereby the variation in carrier concentration gives rise to modulation of the intensity of infrared radiation transmitted through said germanium element, wherein said modulation is substantially due to carrier transitions between the light hole and heavy hole sub-bands, wherein the central region has a carrier concentration sufficient to substantially prevent absorption of infrared radiation in the absence of electrically injected carriers.

30. A device for modulating infrared radiation at a frequency of less than 150 Hz in the spectral range 8–14 $\mu$m input to an infrared detector, said modulation device comprising:

an element of germanium, having facing input and output surfaces, wherein said element of germanium has a valence band comprising light hole and heavy hole sub-bands, means for varying the carrier concentration in said germanium, whereby the variation in carrier concentration gives rise to modulation of the intensity of infrared radiation transmitted through said germanium element, wherein said modulation is substantially due to carrier transitions between the light hole and and heavy hole sub-bands, wherein the element of germanium has a carrier concentration sufficient to substantially prevent absorption of infrared radiation in the absence of injected carriers.

31. The device of claim 30, wherein the means for varying carrier concentration in the germanium element is variable radiation incident on the element.

32. The device according to claim 30, wherein the means for varying carrier concentration in the germanium element is variable electrons impacting said germanium element.

33. A thermal imaging camera comprising an infrared detector and the device for modulating infrared radiation to said infrared detector according to claim 30.

34. A gas sensing system including a source of infrared radiation, an infrared detector and the device for modulating infrared radiation to said infrared detector according to claim 30.

35. The device of claim 30 wherein the means for varying carrier concentration is spatially non-uniform so as to enable the spatial modulation of the incident infrared radiation.

36. A device for modulating infrared radiation at a frequency of less than 150 Hz in the spectral range 8–14 $\mu$m input to an infrared detector comprising:

an element of germanium, having facing input and output surfaces, wherein said element of germanium has a valence band comprising light hole and heavy hole sub-bands, a variable source of light incident on said germanium thereby varying the carrier concentration in said germanium, whereby the variation in carrier concentration gives rise to modulation of the intensity of infrared radiation through said germanium.

* * * * *